3,639,483
METHOD OF PRODUCING 2,4-DIHYDROXY-
BENZOPHENONE AND THE DERIVATIVES
THEREFROM
Hirohisa Shioda, Isamu Namiki, and Hisako Hori, Yokohama, and Yoshihisa Katsuyama, Zushi, Japan, assignors to The Furukawa Electric Company Limited, Tokyo, Japan
Filed July 8, 1968, Ser. No. 743,169
Claims priority, application Japan, July 11, 1967, 42/44,598; May 17, 1968, 43/33,217
Int. Cl. C07c 49/82
U.S. Cl. 260—591     4 Claims

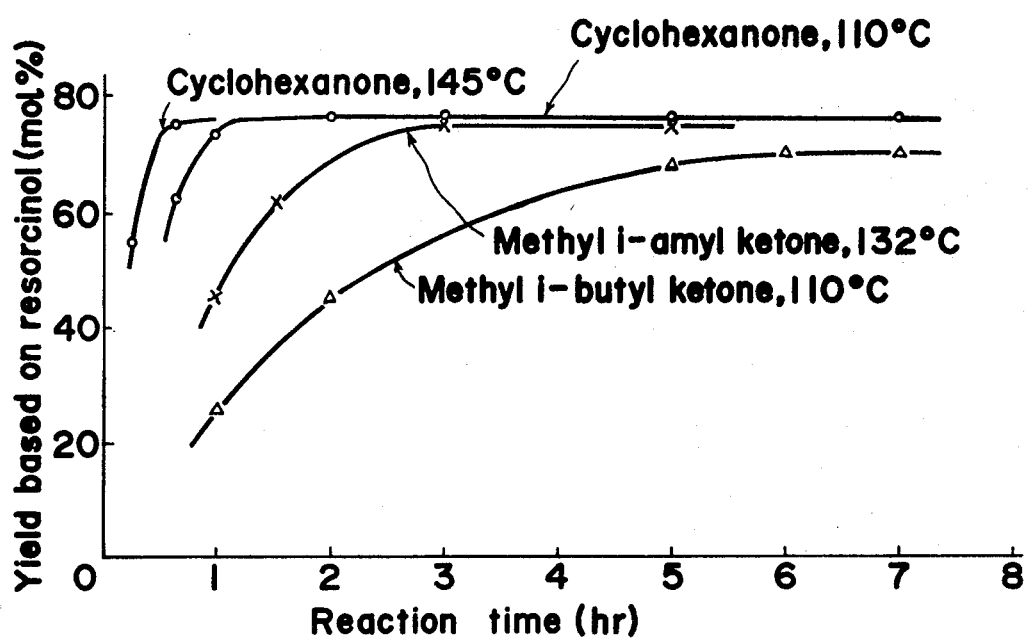

ABSTRACT OF THE DISCLOSURE 2,4-dihydroxybenzophenone is prepared by reacting resorcinol with benzotrichloride in a mixed solvent of water and a water-miscible organic solvent such as a lower aliphatic alcohol at 10° to 90° C. 2-hydroxy-4-alkoxybenzophenone is prepared by reacting 2,4-dihydroxybenzophenone, produced by the above process, with an alkyl halide in saturated ketone having six or more carbon atoms and containing an alkali carbonate or with an alkyl ester of benzenesulfonic acids in an aqueous alkaline solution.

---

The present invention relates to a method of producing 2,4-dihydroxybenzophenone and its derivative, 2-hydroxy-4-alkoxybenzophenone.

Today ultraviolet absorbers are usually compounded in plastics to prevent their deterioration caused by ultraviolet ray and what are desired of such ultraviolet absorbers are that they are inexpensive and are not so colored as to adversely effect the free coloring property of the plastics.

Among the ultraviolet absorbers for such a purpose, 2,4 dihydroxybenzophenone and its derivative, 2-hydroxy-4-alkoxybenzophenone, have been used widely, because a small quantity of these substances gives plastics excellent weather resistance. But they are very expensive for reasons ascribable to the conventional methods of producing 2,4-dihydroxybenzophenone, as follows:

(1) A process using Friedel-Crafts acylation reaction, wherein resorcinol is reacted with benzoic acid or benzoyl chloride in the presence of Lewis acid catalyst, for example, metal halides such as, aluminum chloride, ferric chloride, a mixture of said metal halides and sodium chloride, or boron trifluoride.

(2) A process using Hoesch synthesis, wherein resorcinol is reacted with benzonitrile in the presence of zinc chloride as a catalyst and the resulting 2,4-dihydroxybenzophenone oxime is hydrolyzed.

(3) A process using reaction of resorcinol with benzotrichloride in water.

However, in the process (1), at least the equimolar amount of the Lewis acid, a catalyst, must be added to benzoic acid or benzoyl chloride, the reactant. Moreover since this catalyst forms a stable complex with the object product 2,4-dihydroxybenzophenone, a hydrolysis step must be provided to remove the catalyst from this complex. This makes not only the whole process complicated, but also is defective in that the catalyst itself is hydrolyzed and cannot be recovered. Furthermore, for this process which usually requires a solvent very few are known which make the reaction system homogeneous. Nitrobenzene is most preferable, but it is very poisonous and has a high boiling point, so that its recovery by steam distillation or distillation takes a long time.

The above process (2) is defective in that it uses poisonous and expensive benzonitrile as starting material and ignitable diethyl ether as solvent, that it requires much operating time, as long as about 24 hours, and that it must have a hydrolysis step and is therefore very complicated.

In the above process (3), which was reported many years ago, benzotrichloride is partially hydrolyzed into benzoic acid, and xanthene coloring matter formed by side reaction makes the product colored reddish brown. Such a large amount of by-product lowers the yield of the 2,4-dihydroxybenzophenone, so that this process has never been used practically.

Recently, as means to improve the methods of producing 2,4-dihydroxybenzophenone as described above, the following have been proposed. Namely, in the process (1), a small amount of concentrated sulfuric acid, ion-exchange resin or phosphoric acid is used as the catalyst.

Another means comprises melting and reacting resorcinol and benzoyl chloride in the absence of the catalyst and solvent. However in the former, the yield is as low as about 50% and the catalyst is expensive and in the latter process, a large quantity of by-products is produced by side reaction such as oxidation, so that the yield and the purity lower considerably. Accordingly, such processes are not practicable.

For production of 2-hydroxy-4-alkoxybenzophenone, the derivative of 2,4-dihydroxybenzophenone, a process of alkylating 2,4 - dihydroxybenzophenone has been broadly used, wherein 2,4-dihydroxybenzophenone is reacted with an alkyl halide, particularly, alkyl bromide by using acetone (U.S. Pat. 2,861,053 and 3,006,959), alcohol, or a mixture of alcohol and water as a solvent and an alkali as a catalyst, but the reaction rate is so small in this process that yield is low even after a long reaction time.

As mentioned above, the conventional methods of producing 2,4-dihydroxybenzophenone, and its derivative, 2-hydroxy-4-alkoxybenzophenone need many kinds of starting materials and assistants, many unit operations and a long reaction time. Such complicated process as well as low yield make the production cost high. Many studies have been made to eliminate the above defects, but no satisfactory process has been found yet.

The inventors have made various investigations and found that 2,4-dihydroxybenzophenone substantially free from colored impurities and any other by-products can be obtained at a high yield of more than 80 mol percent, and in such a short time as 2 to 4 hours, by reacting resorcinol with benzotrichloride in a mixture of 90 to 20% by weight of water and 10 to 80% by weight of a water soluble organic solvent at a temperature of 10° to 90° C. without such after-treatment, such as, hydrolysis and removal of the catalyst which are required in the conventional processes.

Moreover, the inventors have found that 2-hydroxy-4-alkoxybenzophenone with substantially no colored impurities can be obtained in a yield of more than 60 mol percent based on resorcinol, as against about 50 mol percent attainable by any conventional process, in a much shorter time, by combining the above described process of producing 2,4-dihydroxybenzophenone with either of the following two alkylation steps.

(A) The resulting 2,4-dihydroxybenzophenone is reacted with the equimolar amount of alkyl halide as an alkylating agent in a saturated ketone having 6 or more carbon atoms and containing an alkali carbonate, such as, potassium carbonate or sodium carbonate..

(B) The resulting 2,4-dihydroxybenzophenone is reacted in an aqueous alkaline solution with alkyl ester of benzenesulfonic acids as an alkylating agent having the general formula

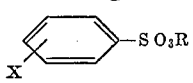

wherein X is hydrogen or p-methyl group and R is an alkyl group.

The method of producing 2,4-dihydroxybenzophenone according to the present invention has the following merits:

(1) Benzotrichloride used in the present invention is the starting material for benzoyl chloride in the conventional process, and is available at a low cost, far lower than that of benzonitrile.

(2) No catalyst is necessary.

(3) The production is done in a single step so that the manufacturing equipment can be much simplified.

(4) Benzotrichloride is much less poisonous, corrosive, and stimulative than benzoyl chloride and benzonitrile used in the conventional processes, ensuring very safe and harmless operation and making it possible to use more inexpensive materials for the equipment.

Both of the above alkylating steps (A) and (B) bring about a high yield in a short time. Especially in the step (B), wherein 2,4-dihydroxybenzophenone is reacted with the above alkylester of benzenesulfonic acid in an aqueous alkaline solution, the coloration of the product is slight, thus simplifying the purification step. Further the reaction is carried out in an aqueous alkaline solution, without using any ignitable and poisonous solvent used in the conventional process in which it must be recovered. Therefore the production step can be more simplified. Accordingly, this process is commercially advantageous.

The organic solvents in the form of a mixture with water, which is the reaction solvent used for the production of 2,4-dihydroxybenzophenone in the present invention, are required to be soluble in water and involve lower alcohols having less than 4 carbon atoms, namely, methanol, ethanol, propanol and butanol. Among them, methanol is most preferable and gives the highest yield and the purest product. Alternatively, ethers, such as ethyl Cellosolve, tetrahydrofuran, dioxan, etc., water soluble lower fatty acids, such as acetic acid, propionic acid, butyric acid, etc., can be used. These organic solvents may be used alone or in admixture.

The reason why the mixing ratio of water and water soluble organic solvent is limited to 90 to 20% by weight of water to 10 to 80% by weight of organic solvent, is as follows:

When the content of the organic solvent is less than 10% by weight or more than 80% by weight, the yield of the object product decreases rapidly and at the same time, the product is considerably colored. The most preferable range of the organic solvent is 20 to 50% by weight within which there are attained little side reaction, low coloration and very high yield.

The reason for limiting the reaction temperature to 10° to 90° C. is as follows:

When the reaction temperature exceeds 90° C., side reactions increase, the object product is considerably colored and the yield decreases, while when the reaction temperature is less than 10° C., the reaction is very slow. The preferable range is 30° to 80° C., more particularly, 40° to 60° C.

The mole ratio of resorcinol to benzotrichloride is not particularly limited and a satisfactory result can be obtained by the theoretical amount. Furthermore, in order to effect the reaction more homogeneously, an emulsifier stable in acidic medium, for example, non-ionic emulsifier such as polyethylene glycol, and cationic emulsifier such as polyoxyethylene alkylamine, may be added to the reaction system.

In alkyl halides used for alkylating 2,4-dihydroxybenzophenone in to 2-hydroxy-4-alkoxybenzophenone by process (A), the alkyl group is not particularly limited and may be properly selected according to the object propuct, but the alkyl group to be used generally has 1 to 20 carbon atoms. The halides involve iodides, bromides and chlorides, but in view of cost and yield, the bromides are preferable. As the reaction solvent in this case, use may be made of saturated ketones having 6 or more carbon atoms, for example, non-cyclic aliphatic ketones such as methyl n-butyl ketone, methyl i-butyl ketone, ethyl propyl ketone, di-n-propyl ketone, di-i-propyl ketone, methyl sec-butyl ketone, methyl tert-butyl ketone, methyl n-amyl ketone, methyl i-amyl ketone, ethyl n-butyl ketone, methyl n-hexyl ketone and the like and cyclic aliphatic ketones, such as, cyclohexanone, methylcyclohexanone, dimethylcyclohexanone, ethylcyclohexanone, trimethylcyclohexanone, propylcyclohexanone, cyclopentanone, etc. Particularly, when cyclohexanone is used, the reaction rate is highest and a higher yield can be attained in a shorter time. The reason why the alkali to be used in the reaction is limited to alkali carbonates is as follows. When other alkali, such as sodium hydroxide is used, the product is deeply colored and the impurity increases and the yield considerably decreases. Among the alkali carbonates, potassium carbonate gives the highest yield and the purest product.

The alkylesters of benzenesulfonic acids used for alkylating 2,4-dihydroxybenzophenone into 2-hydroxy-4-alkoxybenzophenone by process (B), have the general formula:

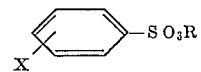

where X is hydrogen or p-methyl group, in which the latter is preferable, and R is an alkyl group, which is not particularly limited and can be properly selected according to the object product, but the alkyl group to be used usually has 1 to 20 carbon atoms.

The alkali used in this case is sodium hydroxide, potassium hydroxide, sodium carbonate, potassium carbonate, sodium bicarbonate or potassium bicarbonate. The potassium carbonate gives particularly high yield.

It is most preferable to effect the reaction under reflux.

For better understanding of the invention, reference is made to the accompanying drawing, wherein:

FIG. 1 represents curve showing the relation between the reaction time and the yield when various saturated ketones having 6 or more carbon atoms are used as a solvent in the alkylation step using n-octyl bromide as an alkylating agent according to the present invention.

The invention will be explained further in detail by the following examples, which are not limitative of the scope of the invention.

EXAMPLE 1

To a solution of 55.0 g. of resorcinol in 110.0 g. of a mixture of methanol and water (methanol: 30% by weight) was added while being stirred, 97.8 g. of benzotrichloride in about 1 hour at 50° C. and the stirring was continued for additional two hours. The reaction mixture was poured into water and the resulting precipitate was filtered, washed with water, and dried to obtain 93.0 g. of yellow needle crystals having a melting point of 141° to 143° C.

The resulting crystals were recrystallized from toluene. From elementary analysis, and infrared and ultraviolet absorption spectra, it was confirmed that the crystals were 2,4-dihydroxybenzophenone. The yield was 87.0 mol %. The total reaction time was about 3 hours.

EXAMPLES 2–6 AND COMPARATIVE EXAMPLES 1–3

In the same manner as described in Example 1, the reactions were carried out under the conditions shown in the following Table 1 and the after-treatment was done to obtain 2,4-dihydroxybenzophenone.

The results are shown in Table 1.

Table 1 also shows Comparative Examples 1-3 which differ from Examples 2-6 of the present invention as under.

COMPARATIVE EXAMPLE 1

Only water was used as a solvent.

COMPARATIVE EXAMPLE 2

The amount of the organic solvent is larger than that specified in the claim.

COMPARATIVE EXAMPLE 3

The reaction temperature was higher than that specified in the claim.

solution, to which was added 150 g. of hydrochloric acid having a concentration of 18%. When the mixture was kept stirred, crystals deposited. The crystals were filtered, washed with water and introduced into water again. After being boiled for about 1 hour under reflux, the mixture was filtered, and the precipitate was washed with water and dried to obtain 18.7 g. of crystal powder having a melting point of 1380 to 142° C. It was confirmed in the same manner as described in Example 1 that the resulting powder was 2,4-dihydroxybenzophenone. The yield was 35.0 mol percent. The total reaction time was about 24 hours.

EXAMPLE 7

To a solution of 27.5 g. of resorcinol in 55.0 g. of a mixture of methanol and water (methanol: 30% by weight)

TABLE 1

| | Amount of starting materials used (g.) | | Solvent | | | Reaction temperature (°C.) | Reaction time (hr.) | Product | | | |
|---|---|---|---|---|---|---|---|---|---|---|---|
| | Resorcinol | Benzotrichloride | Amount (g). | Components other than water | | | | Yield | | Melting point (°C.) | Appearance |
| | | | | Compound | Percent | | | Grams | Mol percent | | |
| Example No.: | | | | | | | | | | | |
| 2 | 55.0 | 97.8 | 110.0 | Ethanol | 20 | 40 | 3 | 88.4 | 82.5 | 141~142 | Orangey yellow needles. |
| 3 | 27.5 | 48.9 | 55.0 | i-Propanol | 25 | 30 | 4 | 45.0 | 84.0 | 140~143 | Do. |
| 4 | 27.5 | 48.9 | 55.0 | Ethyl Cellosolve | 50 | 60 | 3 | 43.8 | 81.7 | 139~143 | Do. |
| 5 | 27.5 | 48.9 | 55.0 | Dioxan | 30 | 60 | 3 | 43.0 | 80.3 | 140~142 | Do. |
| 6 | 27.5 | 48.9 | 55.0 | Acetic acid | 30 | 80 | 2 | 43.2 | 80.5 | 140~143 | Yellowish orange needles. |
| Comparative Example: | | | | | | | | | | | |
| 1 | 27.5 | 48.9 | 50 | None | 0 | 65 | 4 | 22.6 | 42.3 | 135~140 | Reddish brown amorphous solid. |
| 2 | 55.0 | 97.8 | 110.0 | Ethanol | 90 | 40 | 3 | 72.0 | | 100~150 | Dark red amorphous solid. |
| 3 | 55.0 | 97.8 | 110.0 | Dioxan | 30 | 100 | 3 | 53.2 | 49.6 | 136~139 | Reddish brown amorphous solid. |

COMPARATIVE EXAMPLE 4

This example shows the conventional Friedel-Crafts reaction.

27.5 g. of resorcinol, 48.0 g. of aluminum chloride and 100.0 g. of nitrobenzene were mixed at room temperature. Then, 35.1 g. of benzoyl chloride was added thereto, and the resulting mixture was reacted at 70° C. for about 5 hours. The resulting dark red viscous solution was poured into diluted hydrochloric acid while the temperature being kept below 15° C. and stirred vigorously for about 1 hour at the same temperature to complete hydrolysis, whereby a slurry was obtained. Then the slurry was washed with diluted hydrochloric acid for about 1 hour to remove the aluminum compound completely, washed with water until the slurry was neutral, and subjected to steam distillation for several hours to remove nitrobenzene. The resulting red oil was stirred vigorously, dispersed into fine drops by vigorous agitation, cooled and solidified. The solid was filtered and dried to obtain 44.6 g. of yellowish brown powder having a melting point of 133° to 140° C.

It was confirmed in the same manner as described in Example 1 that the resulting powder was 2,4-dihydroxybenzophenone. The yield was 83.3 mol percent. The total reaction time was about 6 hours, excluding the time necessary for after-treatment.

COMPARATIVE EXAMPLE 5

This example shows the convention Hoesch synthesis.

To 200 ml. of diethyl ether were added 27.5 g. of resorcinol, 25.6 g. of benzonitrile and 10.0 g. of zinc chloride as a catalyst. The resulting mixture was kept below 5° C. while stirring and dried gaseous hydrochloric acid was passed therethrough for about 3 hours. Then the mixture was kept at 5° C. for about 20 hours to obtain a viscous was added 48.9 g. of benzotrichloride at 70° C. while stirring and the resulting mixture was reacted for about 3 hours. Then, the reaction mixture was poured into water to obtain precipitates, which were filtered, washed with water and dried to obtain 44.5 g. of reaction product. The reaction product was added to a mixture of 31.0 g. of n-octyl chloride, 31.6 g. of potassium carbonate and 208 g. of cyclohexanone, and the resulting mixture was reacted at about 145° C. for about 5 hours and cooled. Then, the inorganic salt was filtered off from the reaction mixture, and the filtrate was subjected to steam distillation to remove the solvent and unreacted n-octyl chloride, whereby 54.5 g. of orangey yellow needle crystals having a melting point of 45° to 47° C. were obtained. The crystals were recrystallized from methanol to obtain pale yellow needle crystals having a melting point of 47° to 48° C. It was confirmed from elementary analysis, infrared absorption spectrum and ultraviolet absorbtion spectrum that the product was 2-hydroxy-4-n-octoxybenzophenone.

The yield was 66.7 mol percent based on resorcinol. The total reaction time was about 8 hours.

EXAMPLES 8-11 AND COMPARATIVE EXAMPLE 6

In these examples, the alkylation in Example 7 was carried out under the condition as shown in the following Table 2 and the after-treatment was effected in the same manner as described in Example 7 to obtain 2-hydroxy-4-alkoxybenzopheones.

The results are shown in Table 2.

Table 2 also shows Comparative Example 6 in which ketone having less than 6 carbon atoms was used as the solvent.

TABLE 2

| | Alkyl halide | | Solvent | | Reaction temperature (° C.) | Reaction time (hr.) | Product | | | | |
|---|---|---|---|---|---|---|---|---|---|---|---|
| | | | | | | | | Yield | | Melting point (° C.) | Appearance |
| | Compound | Amount (g.) | Compound | Amount (g.) | | | R¹ | Grams | Mol percent | | |
| Example No.: | | | | | | | | | | | |
| 8 | n-Octyl bromide | 40.2 | Methyl i-butyl ketone | 208.0 | 110 | 10 | n-Octyl | 57.6 | 70.7 | 45~47 | Orangey yellow needles. |
| 9 | n-Octyl bromide | 40.2 | Methyl n-hexyl ketone | 208.0 | 161 | 4 | do | 58.0 | 71.3 | 45~47 | Do. |
| 10 | n-Butyl bromide | 28.4 | Cyclohexanone | 208.0 | 145 | 6 | n-Butyl | 48.8 | 72.1 | 52~53 | Do. |
| 11 | n-Octyl bromide | 40.2 | Cyclohexanone | 208.0 | 110 | 6 | n-Octyl | 61.7 | 75.6 | 45~47 | Do. |
| Comparative Example 6 | n-Octyl bromide | 40.2 | Acetone | 208.0 | 58 | 20 | do | 44.0 | 54.0 | 45~47 | Do. |

¹ In the Table 2, R represents the alkyl group in the following general formula:

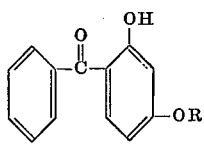

EXAMPLE 12

27.5 g. of resorcinol, 55.0 g. of a mixture of ethanol and water (ethanol: 20% by weight) and 48.9 g. of benzotrichloride were mixed and reacted at 40° C. for about 3 hours while being stirred and then the reaction mixture was poured into water to obtain precipitates, which were filtered, washed with water and dried to obtain 44.2 g. of 2,4-dihydroxybenzophenone. Then, to 44.2 g. of the reaction product were added 58.7 g. of n-octyl p-toluenesulfonate, 57.0 g. of potassium carbonate and 103.0 g. of water, and the resulting mixture was boiled under reflux for about 5 hours while stirring. The reaction mixture was cooled to separate precipitates, which were filtered, washed with water and dried to obtain 60.7 g. of yellow needle crystals having a melting point of 42° to 44° C.

The resulting crystals were recrystallized from methanol to obtain pale yellow needle crystals having a melting point of 47° to 48° C. It was confirmed in the same manner as described in Example 7 that the crystals were 2-hydroxy-4-n-octoxybenzophenone. The yield was 74.3 mol percent based on resorcinol. The total reactions time was about 8 hours.

EXAMPLES 13–16

In the same manner as described in Example 12, the alkylation reaction were carried out under the condition as shown in the following Table 3 and the after-treatment was done to obtain 2-hydroxy-4-alkoxybenzophenones.

The results are shown in Table 3.

For comparison, the production of 2,4-dihydroxybenzophenone and 2-hydroxy-4-alkoxybenzophenone by the conventional processes, will be shown in the following examples.

COMPARATIVE EXAMPLE 7

This example shows a method of producing 2-hydroxy-4-n-octoxybenzophenone by the conventional Friedel-Crafts reaction.

27.5 g. of resorcinol, 48.0 g. of aluminum chloride and 100 g. of nitrobenzene were mixed at room temperature and 35.1 g. of benzoyl chloride was added thereto. The resulting mixture was reacted at 70° C. for 5 hours to obtain a dark red viscous solution. The resulting solution was poured into diluted hydrochloric acid while the temperature being kept below 15° C., and stirred vigorously for about 1 hour at the same temperature to effect hydrolysis, whereby a slurry was obtained.

The slurry was washed with diluted hydrochloric acid for about 1 hour to remove the aluminum compound completely, washed with water until the slurry was neutral and subjected to steam distillation for several hours to remove nitrobenzene. The resulting red oil was dispersed into fine drops by vigorous agitation, cooled and solidified. The solid was filtered and dried to obtain 44.6 g. of yellowish brown powder.

To the reaction product were added 40.2 g. of n-octyl bromide, 31.6 g. of potassium carbonate and 208.0 g. of acetone, and the resulting mixture was reacted for about 7 hours under reflux state (at 58° C.) and cooled. The inorganic salt in the reaction mixture was filtered and

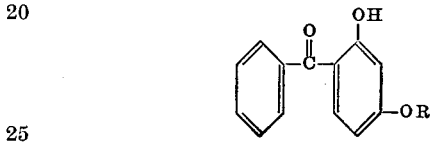

TABLE 3

| | Amount of starting material used (g.) | | Amount of water used (g.) | Reaction temperature (° C.) | Reaction time (hr.) | Product | | | | |
|---|---|---|---|---|---|---|---|---|---|---|
| | Alkyl benzene-sulfonate | Alkali | | | | R* | Yield | | Melting point (° C.) | Appearance |
| | | | | | | | Grams | Mol percent | | |
| Example No.: | | | | | | | | | | |
| 13 | Ethyl p-toluene-sulfonate, 41.4 | Potassium carbonate, 57.0 | 103.0 | Reflux | 8 | Ethyl | 45.6 | 75.3 | 50~52 | Yellow needles. |
| 14 | n-Octyl p-toluene-sulfonate, 58.7 | Sodium carbonate, 43.8 | 207.0 | do | 8 | n-Octyl | 51.7 | 63.5 | 43~45 | Do. |
| 15 | n-Octyl p-toluene-sulfonate, 58.7 | Potassium hydzoxide, 13.2 | 456.0 | do | 8 | do | 49.6 | 61.0 | 42~44.5 | Do. |
| 16 | n-Octyl benzene-sulfonate, 56.1 | Potassium carbonate, 57.5 | 104.0 | do | 8 | do | 54.2 | 66.4 | 41.5~44 | Do. |

* In the above Table 3, R represents the alkyl group in the following general formula:

the filtrate was subjected to steam distillation to remove the solvent and unreacted n-octyl bromide, whereby 32.3 g. of orangey yellow solid having a melting point of 45° to 47° C. was obtained. The solid was recrystallized from methanol to obtain pale yellow needle crystals having a melting point of 46° to 47° C.

It was confirmed in the same manner as described in Example 7 that the resulting crystals were 2-hydroxy-4-n-octoxybenzophenone.

The yield was 39.6 mol percent based on resorcinol. The total reaction time was about 13 hours.

COMPARATIVE EXAMPLE 8

To a solution of 27.5 g. of resorcinol in 55.0 g. of a mixture of methanol and water (methanol: 30% by weight) was added 48.9 g. of benzotrichloride at 70° C. while stirring and the resulting mixture was reacted for about 3 hours. The reaction mixture was poured into water to obtain precipitates, which were filtered, washed with water and dried to obtain 44.5 g. of reaction product. The reaction product was added to a mixture of 40.2 g. of n-octyl bromide, 18.3 g. of sodium hydroxide and 208.0 g. of cyclohexanone, and the resulting mixture was reacted at 145° C. for about 5 hours and cooled, after which the inorganic salt was filtered off from the reaction mixture.

The filtrate was subjected to steam distillation to remove the solvent and unreacted n-octyl bromide, and 42.7 g. of dark brown crystalline solid having a melting point of 38° to 43° C. was obtained, which was recrystallized from methanol to obtain pale yellow needle crystals having a melting point of 47° to 48° C. It was confirmed in the same manner as described in Example 7 that the crystals were 2-hydroxy-4-n-octoxybenzophenone. The yield was 51.0 mol percent based on resorcinol. The total reaction time was 8 hours.

What is claimed is:

1. A method of producing 2 - hydroxy - 4 - alkoxy benzophenone which comprises
   reacting 2,4-dihydroxybenzophenone with the equimolar amount of an alkyl halide as an alkylating agent
   in a saturated cyclic aliphatic ketone having six or more carbon atoms
   in the presence of an alkali carbonate.
2. The process according to claim 1, wherein said alkyl halide is n-octyl chloride.
3. The process according to claim 1, wherein said alkyl halide is n-octyl bromide.
4. The process according to claim 1, wherein said saturated cyclic aliphatic ketone is cyclohexanone.

References Cited

UNITED STATES PATENTS 3,006,959  10/1961  Armitage et al. _____ 200—591

FOREIGN PATENTS 54,661  11/1890  Germany _____ 200—591
10,095   1890    Great Britain _____ 260—591

OTHER REFERENCES

Ogata et al., Chemical Abstracts 45, 5122a (1951).
Oka et al., Chemical Abstracts 46, 8043t (1952).

DANIEL R. HORWITZ, Primary Examiner